United States Patent [19]

Shigemasa et al.

[11] Patent Number: 4,726,185
[45] Date of Patent: Feb. 23, 1988

[54] FLAT TYPE TORQUE CONVERTER

[75] Inventors: Masayoshi Shigemasa; Fujio Ohshima, both of Hiroshima; Kazuhisa Tamura; Takao Fukunaga, both of Hirakata; Takashi Okuno, Osaka, all of Japan

[73] Assignees: Mazda Co., Ltd., Hiroshima; Kabushiki Kaisha Daikin Seisakusyo, Osaka, both of Japan

[21] Appl. No.: 854,624

[22] Filed: Apr. 22, 1986

[30] Foreign Application Priority Data

Apr. 23, 1985 [JP] Japan .................................. 60-87323

[51] Int. Cl.$^4$ ............................................. F16D 33/00
[52] U.S. Cl. .................................................... 60/361
[58] Field of Search ................... 60/361, 362, 341, 345

[56] References Cited

U.S. PATENT DOCUMENTS 3,797,243  3/1974  Trusov .............................. 60/362 X
4,191,015  3/1980  Komatsu et al. ....................... 60/361
4,624,105  11/1986  Nishimura et al. ..................... 60/361

Primary Examiner—Edward K. Look
Attorney, Agent, or Firm—Armstrong, Nikaido, Marmelstein & Kubovcik

[57] ABSTRACT

A flat-type torque converter wherein a toroid is formed of a turbine having a plate-worked turbine blade, a pump having a plate-worked pump blade and a stotor having a cast-iron stator blade, and a ratio $L_1/(r_2-r_1)$ of a toroid axial dimension $L_1$ to its radial dimension $(r_2-r_1)$ lines between 0.67 and 0.87, a ratio $r_1/r_2$ of a toroid internal radius $r_1$ to its external radius $r_2$ lies between 0.39 and 0.46, and the converter has a small axial thickness; characterized by that a wall thickness of the stator blade is made small so that an effective passage cross section inside the stator blade can be secured, a flow-in side tip edge of the stator blade is formed into a flat-shape, a core-side and a shell-side of the stator blade are formed by being twisted, and a core-side length of the stator blade is fabricated as long as possible.

4 Claims, 6 Drawing Figures

FLAT TYPE TORQUE CONVERTER

BACKGROUND OF THE INVENTION

1. Industrial Useful Field

This invention relates to a so-called flat-type torque converter having a small axial thickness, and especially to an improvement in passage shapes of a turbine, a pump and a stator and a shape of a stator blade.

2. Prior Art

Generally, a torque converter forms a toroid wherein fluid circulates througe a turbine, a pump and a stator, and it is an important condition for maintaining a good torque converter efficiency to preset a passage cross section to an approximately constant value over the entire region of the toroid and to preset a velocity component of circulating fluid along a plane including an axis of rotation (abbreviated to a meridian plane component, hereunder) to a constant value over the entire region of the toroid.

In recent year a flat-type torque converter having a small axial thickness has been developed. As for this flat-type torque converter, a prior art (Examined Japanese Patent Publication No. 57-37791) is well known, wherein a flow turbulence of circulating fluid inside the toroid is reduced by throttling a passage cross section of toroid to some extent in its way, for example.

In such the prior art, however, the passage cross section is throttled in its way so that a passage resistance increases to make it difficult to preset shapes of the turbine, the pump and the stator.

Further, a prior art (Unexamined Japanese Patent Publication No. 58-152965) is well known, wherein passage cross sections are kept constant for the turbine and the pump, and a passage cross section is throttled in its way giving prominence to the uniformalization of said meridian plane component as for the stator.

In such the second prior art, however, a passage resistance at the stator section increases to make it difficult to preset a shape of stator.

OBJECT OF THE INVENTION

An object of the invention is to provide a flat-type torque converter which can maintain both a flow passage cross section and a meridian plane component constant over the entire toroid region by contriving a stator blade.

COMPOSITION OF THE INVENTION

In a flat-type torque conveter having a small axial thickness, in which a toroid is formed of a turbine having a plate-worked turbine blade, a pump having a plate-worked pump blade and a stator having a cast-iron stator blade, a ratio $L_1/(r_1-r_2)$ of a toroid axial dimension $L_1$ to its radial dimension $(r_2-r_1)$ lies between 0.67 and 0.87 and a ratio $r_1/r_2$ of a toroid internal radius $r_1$ to its external radius $r_2$ lies between 0.39 and 0.46; the flat-type torque converter is made small in its wall thickness of the stator blade so that an effective passage cross section within the stator can be secured, a flow-in side tip edge of the stator blade is formed into a flat edge-shape, a core-side and a shell-side of the stator blade are formed by being twisted, and a core-side length of the stator blade is fabricated as long as possible.

BRIEF DESCRIPTION OF THE INVENTION

DETAILED DESCRIPTION OF THE INVENTION

Embodiment

Figure 1:
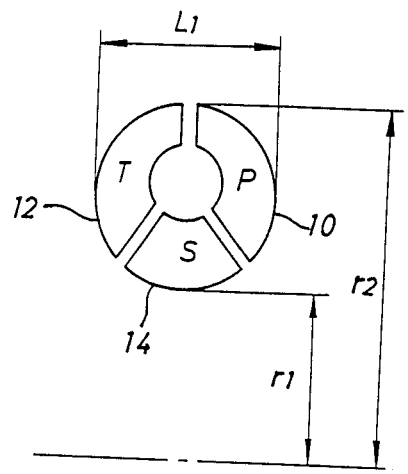
FIG. 1 is a schematic structural view of a flat-type torque converter applied with the present invention.

In FIG. 1 showing a flat-type torque converter for an automobile applied with the present invention, a pump 10 is a pump coupled to a flywheel (not shown) of an engine. A turbine 12 is disposed just in front of the pump 10, and the turbine is coupled to a planetary gear type speed changer (not shown). A stator 14 is disposed between the pump 10 and the turbine 14, and these pump 10, turbine 12 and stator 14 form a toroid. A ratio $L_1/(r_2-r_1)$ of a toroid axial dimension $L_1$ to its radial dimension $(r_2-r_1)$ lies between 0.67 and 0.87, and a ratio $r_1/r_2$ of a toroid internal radius $r_1$ to its external radius $r_2$ is preset to a value ranging from 0.39 to 0.46.

In these numerical value limited range, the toroid axial dimension $L_1$ becomes small to provide a space for accomodating a lockup clutch in the torque converter even when an axial overall dimension of the torque converter is preset to an approximately same value as that of a conventional round-type torque converter. Further, according to the above-mentioned numerical value condition, a slippage can be reduced in a high speed ratio zone to permit a rotation speed of the turbine 12 rise toward that of the pump 10 up to a speed ratio zone closer to a directly coupled state. Therefore, a shock becomes hard to be generated at the time of engaging or disengaging said lockup clutch, and a passage cross section inside the torque converter is kept constant as described later in details.

Although a section of the torque converter is illustrated as a so-called round-shape which is formed into an approximately round contour in FIG. 1, in practical application it is formed to the flat-type one having the small axial dimension $L_1$ as described above.

Figure 1A:
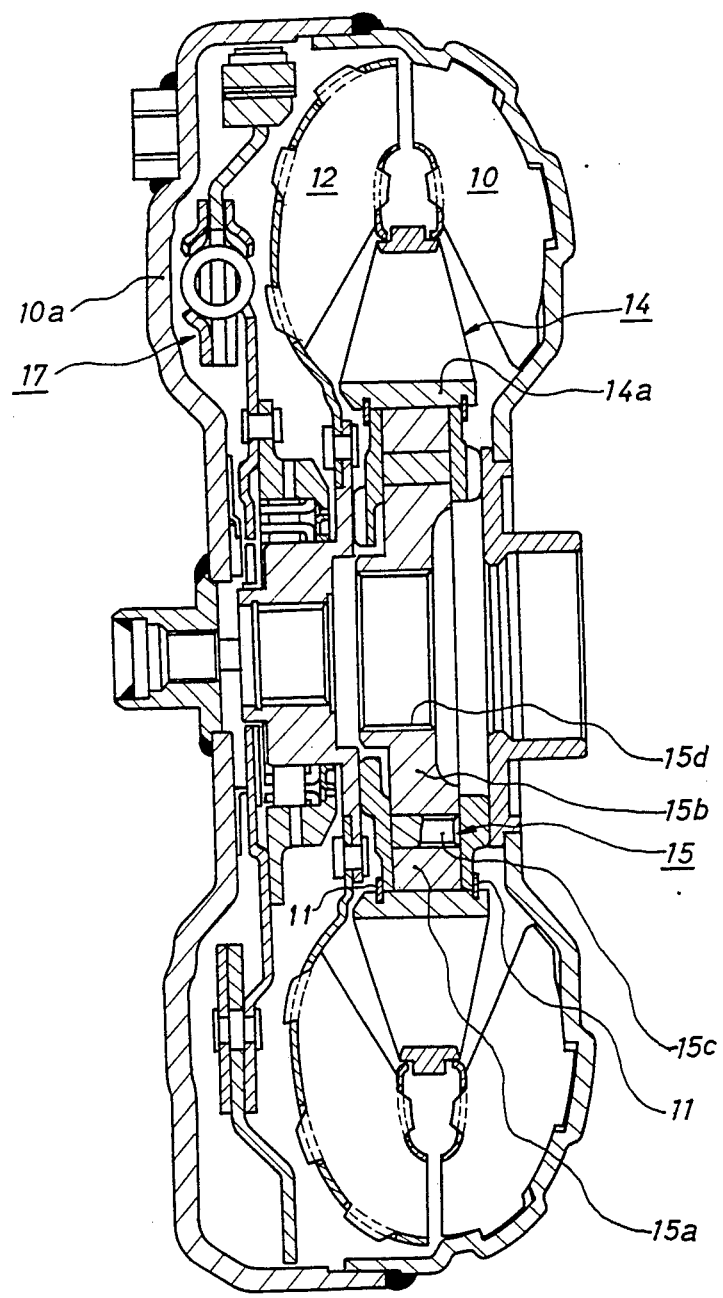
FIG. 1a is a vertical sectional view of a design example of the flat-type torque converter.

As illustrated in FIG. 1a showing a practical design example of the flat-type torque converter of FIG. 1, a stator 14 described later in details is disposed between the pump 10 and the turbine 12. The stator 14 is an annular aluminum cast integral part, and a boss 14a of the stator 14 is secured to an outer race 15a of a one-way clutch 15 by means of a snap ring 11. A roller 15c is interposed between the outer race 15a and an inner race 15b. An internal tooth 15d of the inner race 15b is adapted to spline fit onto an output shaft (not shown).

A well-known lockup clutch 17 is provided between the turbine 12 and the front cover 10a, and the lockup clutch 17 is adapted to transmit an engine power entering the front cover 10a to said output shaft in the high speed ratio zone.

Figure 1B:
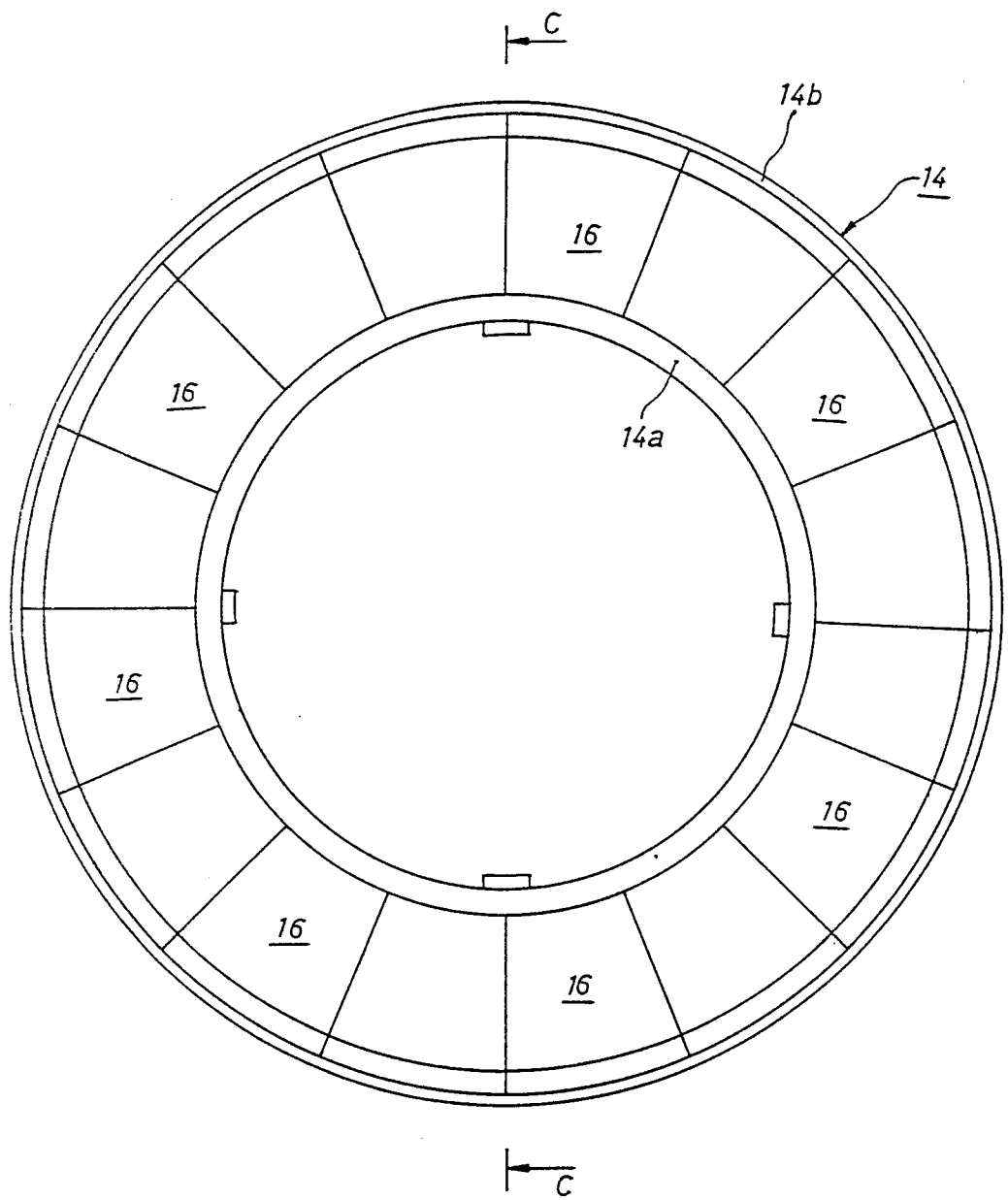
FIG. 1b is a rear view of a stator.
Figure 1C:
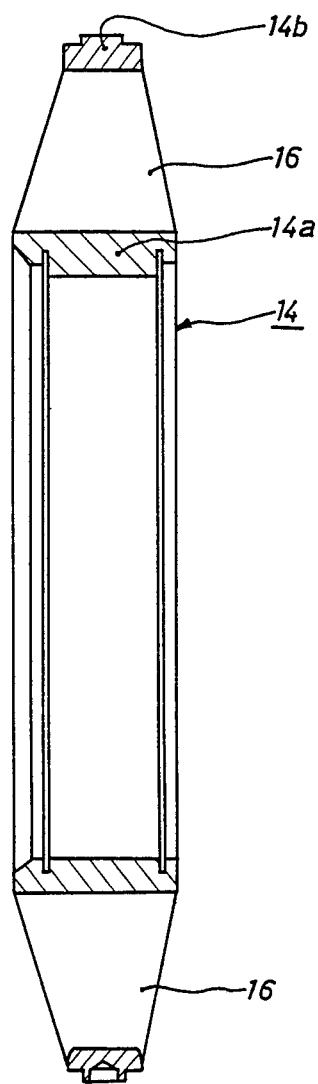
FIG. 1c is a sectional view taken on a line c—c of FIG. 1b.

In the stator 14 as shown by FIG. 1b and FIG. 1c, sixteen stator blades 16 which are the major object of this invention and will be described later in details are arranged in radial outward direction of the annular boss 14a with equal spaces left therebetween, and further radial outer peripheral edges of the blades 16 are interconnected by a core ring 14b. The boss 14a, the blades 16 and the core ring 14a are formed into an aluminum cast integral part.

Blades of the pump 10 and the turbine 12 are plate worked and formed into thin-wall shapes, and passage cross sections of the pump 10 and the turbine 12 are preset to an approximately constant value.

Figure 2:
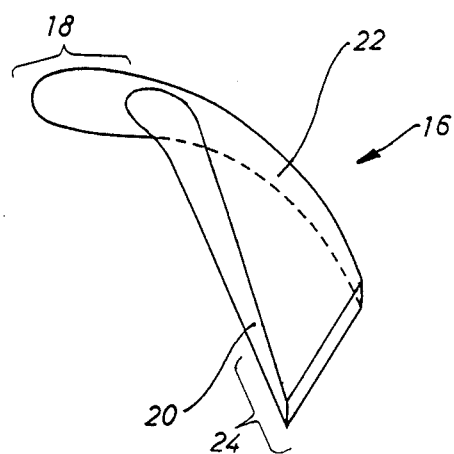
FIG. 2 is a plan view of a stator blade.

A blade of the stator 14 is made of cast-iron and formed into a comparatively thick-wall shape, and as shown in FIG. 2 a blade of the stator 14 is so formed as to preset its passage cross section constant and the same as those of the pump 10 and the turbine 12 and to maintain the meridian plane component constant.

As shown in FIG. 2 viewing a blade 16 of the stator 14 from a core-side of the toroid, the blade 16 is formed into a thin shape in the whole as compared with a conventional one, and a passage cross section of the stator 14 is preset constant and the same as those of the pump 10 and the turbine 12 while securing an effective passage cross section inside the stator 14. Further, a flow-in side tip edge 18 of the blade 16 is formed into a flat edge-shape as compared with a conventional one. Moreover, a core-side end 20 of the blade 16 is formed twistingly in relation to a shell-side end 22 with a radial direction of the stator 14 taken as its center line and a core-side length of the blade 16 is made as long as possible, so that a rectification effect of the stator 14 can be obtained sufficiently.

Namely, in more detail, the blade 16 of the stator 14 is so formed that the core-side end 20 twists a flow-out side rear edge 24 in relation to the shell-side end 22 toward an inside of a blade bent direction with the radial axis of the stator 14 taken as its center line. Furthermore, a cross section of the blade 16 is formed so as to become gradually small as it extends from the radially inner end 22 to the radially outer end 20.

Accordingly, in case when the torque converter is formed into the flat-shape as described above, a direction of flow must be changed by a specified angle within a shorter distance in the flow passage formed between cascade of blades so that a vortex flow is apt to be produced in the flow passage between the cascade of blades. However, in case of FIG. 2, the core-side end 20 is twisted in relation to the shell-side end 22 and the length of the core-side end 20 is made long so that the blade 16 exerts a large rectification effect to prevent said vortex flow from generating.

Function will be described hereunder. The blade 16 of the stator 14 is formed into the thin-shape in the above-mentioned flat-type torque converter so that the passage cross section in the toroid can be preset constant, and the blade 16 of the stator is made in its coreside length as long as possible so that the meridian plane component from fluid acting on the blade 16 is also preset to the same as those of the pump 10 and the turbine 12. Consequently, the core-side length of the blade 16 is preset to approximately same as that of the round-type converter to improve the rectification effect.

Figure 3:
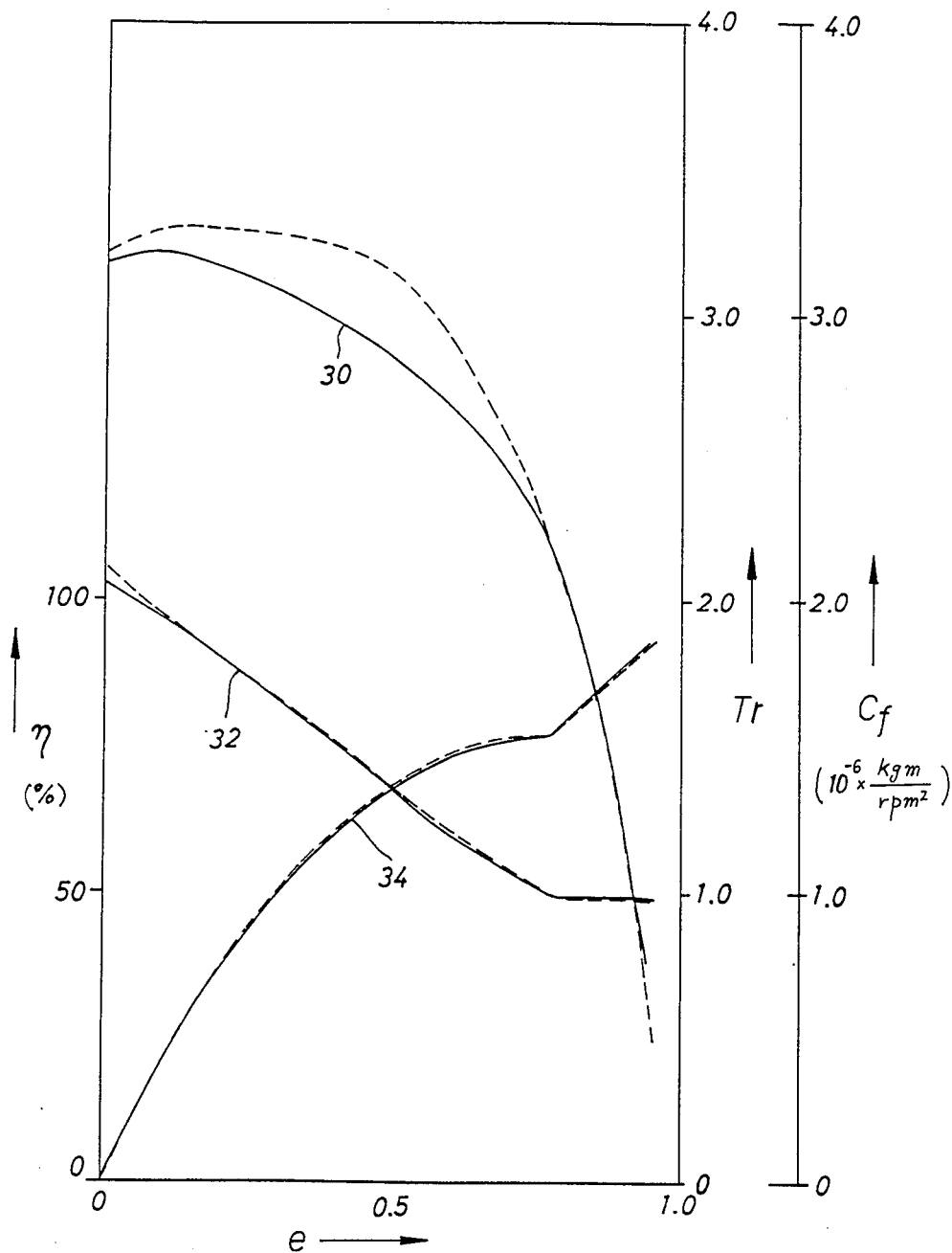
FIG. 3 is a graph showing a capacity factor, a torque ratio and an efficiency according to the present invention.

As shown in FIG. 3 graphing changes of a torque ratio Tr, a capacity factor Cf and an efficiency $\eta$ with respect to a speed ratio e, a performance of the flat-type torque converter can be observed as follows: The capacity factor Cf shown by a characteristic 30 traces a curve which is different from a curve of broken line for the round-type converter. However, the torque ratio Tr shown by a characteristic 32 and the efficiency $\eta$ shown by a characteristic 34 develope approximately same characteristic as those shown by curves of broken lines for the round-type converter. Therefore, both the torque ratio Tr and the efficiency $\eta$ are excellent samely as the round-type converter.

Effect of the Invention

As described above, in the flat-type torque converter having a small axial thickness; the passage cross sections are maintained approximately constant for the turbine 12 having the plate-worked turbine blade, the pump 10 having the plate-worked pump blade and the stator 14 having the cast-iron stator blade, the wall thickness of the stator blade is formed into the thin-shape so as to secure the effective passage cross section inside the stator, the flow-in side tip edge 18 of the stator blade is formed into the flat edge-shape, the core-side end 20 and the shell-side end 22 of the stator blade 16 are formed twistingly, the core length of the stator blade 16 is fabricated as long as possible. Consequently, the shape of toroid comprising the pump 10, the turbine 12 and the stator 14 becomes simple and the shape of toroid can be designed easily even when a capacity of torque converter is subjected to changes.

Further, since the cast-iron blade 16 of the stator 14 is formed as described above, the passage resistence in the stator 14 is reduced to improve the rectification effect of the stator blade 16, so that the excellent torque converter performance including approximately same torque ratio and the efficiency as those of the round-type torque converter can be obtained.

The ratio $L_1/(r_2-r_1)$ of the axial dimension $L_1$ to the radial dimension $(r_2-r_1)$ of the toroid lies between 0.67 and 0.87 and the ratio $r_1/r_2$ of the internal radius $r_1$ to the external radius $r_2$ is preset to a value ranging from 0.39 to 0.46. Therefore, the toroid axial dimension $L_1$ becomes small to provide the space for accomodating the lockup clutch in the torque converter even when the axial overall dimension of the torque converter is preset to the approximately same value as that of the conventional round-type torque converter. As the result, the torque converter can be decreased in its size even when it incorporates the lockup clutch.

Moreover, in case when the torque converter is formed into the flat-shape as described above, the direction of flow must be changed by the specified angle within the shorter distance in the flow passage formed between cascade of blades so that the vortex flow is apt to be produced in the flow passge between the cascade of blades. However, in case of FIG. 2, the core-side end 20 is twisted in relation to the shell-side end 22 and the length of the core-side end 20 is made large so that the blade 16 exerts the large rectification effect to prevent said vortex from generating.

What is claimed is:

1. A flat-type torque converter wherein a toroid is formed of a turbine having a plate-worked turbine blade, a pump having a plate-worked pump blade and a stator having a cast-iron stator blade, and a ratio $L_1/(r_2-r_1)$, where $L_1$ is the axial length of the formed toroid; $r_1$ is the internal radius of the toroid; and, $r_2$ is the external radius of the toroid; the ratio of $L_1$ to $(r_2-r_1)$, is between 0.67 and 0.87, the ratio $r_1/r_2$ is between 0.39 and 0.46 and the axial thickness of the converter is smaller than the radial thickness $r_2-r_1$ characterized by a stator having a core ring, a shell ring and circumferentially spaced blades mounted between said core and shell rings axially thereof, each of said blades having a core-side and a shell-side, said core-side and said shell side of each of said blade being twisted relative to said core ring and said ring shell and relative to each other, all in the same direction, each of said blades having a flat-shaped flow-in side top edge between said rings and a curved-shaped flow-out side edge between said rings, said twist of said core-side of said blades at said core ring, relative to the axis of said core ring, being larger than said twist of said shell side at said shell ring and forming a stator blade length relative to said core ring at said core side of said blade larger than the stator blade length relative to said shell ring at said shell side of said blade.

2. A flat-type torque converter as set forth in claim 1, in which said stator blade is so formed that said core-side twists relative to said shell-side and toward an inside of the blade twist direction with a radial axis of the stator taken as its center line.

3. A flat-type torque converter as set forth in claim 1, in which a cross section of said stator blade is formed so as to decrease in thickness as said cross section extends from the shell-side end to the core-side end.

4. A flat-type torque converter as set forth in claim 1, in which the passage cross sections of the pump, the turbine and the stator are preset to an approximately constant value, and a meridian plane component of working fluid flowing through an inside of said torque converter is kept approximately constant across said pump, said turbine and said stator.

* * * * *